United States Patent [19]

Hopkins

[11] 3,839,811

[45] Oct. 8, 1974

[54] SAFETY HOOK HOLDER

[76] Inventor: Roy D. Hopkins, 301 E. 3rd St., Texarkana, Ariz. 75501

[22] Filed: Oct. 11, 1972

[21] Appl. No.: 299,612

[52] U.S. Cl. .............................................. 43/25.2
[51] Int. Cl. ........................................ A01k 87/00
[58] Field of Search ................................... 43/25.2

[56] References Cited
UNITED STATES PATENTS

| 1,550,080 | 8/1925 | Lehrritter | 43/25.2 |
| 2,556,403 | 6/1951 | Sokolik | 43/25.2 |
| 3,411,232 | 11/1968 | Rumbaugh | 43/25.2 |
| 3,425,150 | 2/1969 | Braese | 43/25.2 |
| D217,663 | 5/1970 | Chamberlain | D22/23 |

Primary Examiner—Louis G. Mancene
Assistant Examiner—J. Q. Lever
Attorney, Agent, or Firm—Larson, Taylor & Hinds

[57] ABSTRACT

A holder for the hook of a fishing rod or pole is provided which prevents the hook from causing damage during handling of the pole. The holder includes a slotted cylindrical body portion which fits onto the pole and an "eyelet" portion extending outwardly from the body portion. In use, after the holder is mounted on the pole, the hook is inserted into the eyelet and the pole twisted or rotated, with the holder is held fixed, so that the line wraps around the pole and is tensioned to pull the hook snugly against the holder. The holder may include a recess adjacent the eyelet which aids in preventing exposure of the hook barb.

4 Claims, 6 Drawing Figures

PATENTED OCT 8 1974  3,839,811

SAFETY HOOK HOLDER

FIELD OF THE INVENTION

The invention relates to a safety hook holder for a fishing pole or rod which prevents personal injury and/or damage to clothing and the like from the fishing hook.

BACKGROUND OF THE INVENTION

The barbed end of a fishing hook has always presented a serious safety problem. In general, safety techniques involving the problem are primarily concerned with the time when the rod is handled before and after fishing since it is at this time that the hook can be shielded or otherwise prevented from doing damage. These techniques range from simply hooking the hooks onto a part of the rod or embedding the barbs of the hooks in pieces of cork, to relatively complex, and hence expensive, safety guards designed for this purpose. The problem is a particularly vexing one for users of simple cane poles, who generally do not wish to spend a lot of money for a hook guard, since the simplest techniques are not always effective (the pieces of cork get lost or crumble into pieces and a simple cane pole does not provide a convenient attachment point for the hook). In any event, the prior art safety techniques for fishing hooks generally are not satisfactory, for a variety of reasons.

Examples of prior art devices used for this purpose are disclosed in U.S. Pat. Nos. 2,028,477 (Rupp); 2,527,625 (Fields); 2,993,293 (Blout); 3,281,981 (Dykhouse); 3,292,298 (Mullikin); 3,411,232 (Rumbaugh); and 3,521,393 (Gordon), although this list is not, of course, represented to be exhaustive.

SUMMARY OF THE INVENTION

In accordance with the invention, a method of storing the hook and line of a fishing rod or pole is provided which prevents the hook from causing personal injury and/or damage to clothing or other property. The method involves the use of a safety hook holder which is a very simple, rugged construction but which effectively prevents the hook barb from exposure. Because of the simplicity thereof, the holder is relatively inexpensive to manufacture thus making it particularly attractive to those who cannot, or do not wish to, spend a great deal of money on fishing equipment. In general, the method of the invention is simple yet highly effective in serving its purpose.

According to the method of the invention, a safety hook holder is provided which is of simple, part cylindrical shape including a slot, located between the resilient, inwardly biassed arms thereof, which enables the holder to readily mounted on the pole or rod, preferably at a location which is some distance from the end of the pole to which the line is attached. The holder also includes means defining an aperture or eyelet which is adapted to receive the hook therein. With the holder mounted on the pole, the barbed end of the hook is inserted through the eyelet so that the barbed end lies inwardly of the shank end. The holder is then held fixed while the pole is twisted or rotated relative thereto so that the line which attaches the hook to the pole is correspondingly twisted or wrapped around the pole and, accordingly, so that the hook is pulled snugly against the holder. In this way both the line and hook are readily stored and the hook is prevented from doing damage.

The holder may be slid along the pole to control the tension on the line and holder itself can be constructed with a recessed surface adjacent the eyelet to ensure non-exposure of the hook barb. The holder is preferably of one-piece construction with the eyelet molded integrally with the body portion which forms the mounting arms, from a material such as plastic or molded rubber.

Other features and advantages of the invention will be set forth in or apparent from the detailed description of the preferred embodiments found hereinbelow.

DESCRIPTION OF THE PREFERRED EMBODIMENTS

Figure 1:
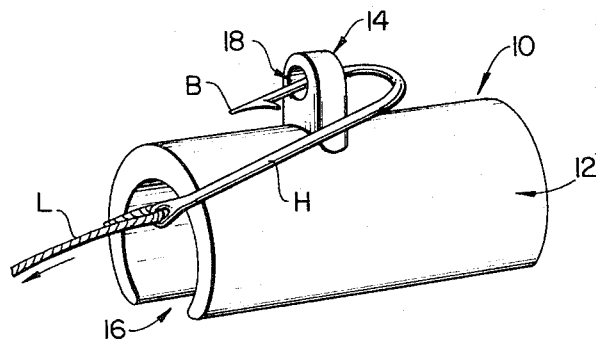
FIG. 1 is a perspective view of a safety fish hook holder in accordance with one embodiment of the invention, with a hook shown in place.
Figure 2:
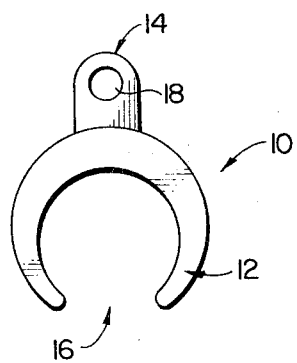
FIG. 2 is an end view of the embodiment of FIG. 1 with the hook removed for purposes of clarity.

Referring to FIGS. 1 and 2, a presently preferred embodiment of a safety hook holder in accordance with the invention is shown. The holder, which is generally denoted 10, includes body portion 12 and an eyelet portion 14. As illustrated, the body portion 12 is of slotted cylindrical construction, a longitudinal slot 16 in what is the bottom wall of the cylinder as viewed in FIGS. 1 and 2 enabling the holder to be force fit onto a fishing rod. The eyelet portion 14 extends upwardly, or, more generally, outwardly, from body portion 12 and includes an aperture or eyelet 18 therein. Holder 10 is preferably constructed of a somewhat resilient or flexible material such as plastic or molded rubber and, as set forth hereinabove, is preferably molded so that eyelet portion 14 and body portion 12 are integral. A somewhat resilient material is preferred to permit holder 10 to be force fit onto a fishing rod or pole. The longitudinal axis of the eyelet 18 is parallel to the longitudinal axis of body portion 12 so that the point or barb B of a hook H received in eyelet 18 will lie along the upper surface of body portion 12. As explained hereinbelow tensioning of a line L will cause hook H to "snug down" on holder 10 with barb B located generally centrally of the upper surface of portion 12 so that the barb B is not exposed.

Figure 3:
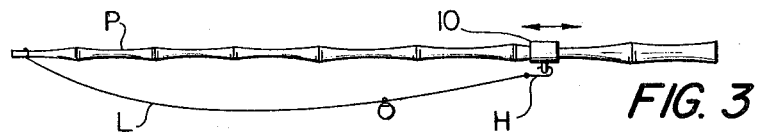
FIGS. 3 and 4 are side elevational views of the holder of the invention mounted on a fishing pole, illustrating the method of the invention.
Figure 4:
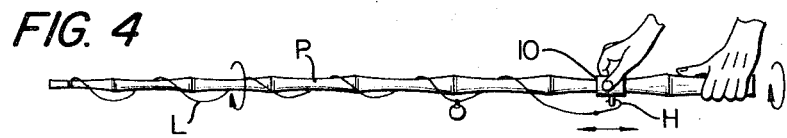

Referring to FIGS. 3 and 4, the operation of the holder of FIG. 1 in protecting the hook from doing damage is illustrated. As shown, holder 10 is mounted on a cane pole, denoted P, adjacent the end thereof opposite to which the line L is attached. A short length of line is shown in FIG. 3 but it will be understood that a line of any length may be used. The gripping forces provided by holder 10 are such that, while the holder is firmly secured to the pole P, the holder 10 can be moved longitudinally along pole P. For a pole of irregular diameter, such as the cane pole illustrated, this longitudinal movement permits the holder 10 to be positioned along the pole to a location where there is a good fit between the holder 10 and the pole. To store the hook H safely, after the holder 10 is mounted on pole P and adjusted in position as needed, the barbed end of the hook is inserted into eyelet 18 as described above regarding FIG. 1. The holder 10 is then held firm as shown in FIG. 4, and the pole P twisted or rotated as indicated by the arrows so that the line L is wrapped around the pole P. As the line L is wrapped more tightly or completely around the pole P, the tension on the line L in the vicinity of the hook is increased so that the hook H is pulled down on the holder 10 and held firmly in place with the barb B out of danger. Thus, the invention provides a simple yet highly effective way of safely storing a hook and the associated line. The tension on line L and hence the force exerted on hook H can be adjusted by adjusting the longitudinal position of holder 10 on pole P.

Figure 5:
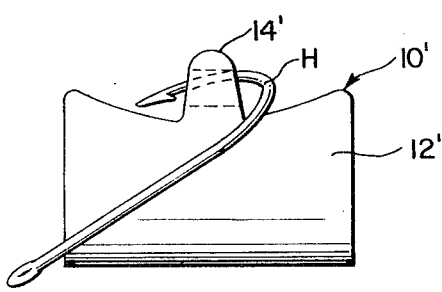
FIG. 5 is a side elevational of a safety hook holder in accordance with a further embodiment of the invention.

Referring to FIG. 5, an alternative embodiment of the holder of the invention is shown. The embodiment of FIG. 5 is very much similar to that of FIGS. 1 and 2 and corresponding elements have been given the same numbers with primes attached. In this embodiment the upper surface of the body portion 12' of the holder 10' is recessed or concave in the vicinity of eyelet portion 14' as illustrated. This serves to further ensure that the hook barb is not exposed.

Figure 6:
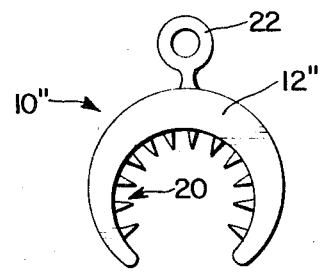
FIG. 6 is an end view of yet another embodiment of the invention.

Referring to FIG. 6, yet another embodiment of the holder of the invention is shown. Again, this embodiment is similar to that of FIGS. 1 and 2 and corresponding elements have been given the same numbers with double primes attached. In this embodiment the inner gripping surfaces of body portion 12" have been corrugated as indicated at 20 to provide improved gripping. Further, the eyelet portion of the preceding embodiments has been replaced by an eyelet formed by a simple metal screw ring 22. The screw ring 22 is constructed of a non-rust metal and the threaded shank preferably includes a solid washer (not shown) built in thereto. To keep the screw 22 from separating from the holder or extending below the top of the holder 10", a nut (not shown) can be used which is screwed into a counter sunk recess (not shown) to keep the metal from contact with the pole.

It will be appreciated by those skilled in the art that the above embodiments are merely exemplary of a number of variations and modifications that can be effected without departing from the scope and spirit of the invention.

I claim:

1. A method of using a hook holder having a hook-receiving aperture therein so as to prevent personal injury and/or damage to clothing or the like when handling and storing a fishing pole of the cane pole type having a line attached to one end thereof and at least one barbed hook secured to the line, said method comprising the steps of mounting the hook holder onto the fishing pole at a location along the length thereof spaced from the other end of the pole, inserting the hook in the aperture of the holder with barb of the hook inwardly of the shank end of the hook, and rotating the pole while firmly holding the holder fixed so as to tension the line and pull the hook snugly against the holder so that the hook barb is located out of danger of contact.

2. A method as claimed in claim 1 further comprising adjusting the longitudinal position of the holder on the rod to control the tension on the line adjacent the hook.

3. A safety hook holder for storing a hook while attached to a fishing pole so as to prevent damage so as might be caused by the barbed end of the hook, said holder comprising a substantially cylindrical body portion having a longitudinal slot therein for receiving the pole so that the pole can be rotated relative to the holder when the holder is held fixed, and an eyelet portion integral with said body portion and extending outwardly therefrom, said eyelet portion defining an aperture therein for receiving a hook, the longitudinal axis of said aperture extending parallel to the pole with the holder in place on the pole and said body portion being of such axial extent that the end thereof extends beyond the barb of any hook received in said aperture, said body portion including means comprising recessed areas adjacent said eyelet portion on opposite sides thereof for aiding in preventing exposure of the barb of a hook received in said aperture.

4. A safety hook holder as claimed in claim 3 wherein said recessed area are formed by a concave recess in the upper surface of said body portion.

* * * * *